UNITED STATES PATENT OFFICE 2,525,231

1,3,3-TRIMETHYL-2,4-DIOXO PIPERIDINE

Edouard Masset, Basel, Switzerland, assignor to Hoffmann-La Roche Inc., Nutley, N. J., a corporation of New Jersey No Drawing. Application April 30, 1948, Serial No. 24,420. In Switzerland June 12, 1947

1 Claim. (Cl. 260—293)

Phenyl-ethyl-barbituric-acid was the first bromine-free anti-epileptic agent to be introduced in therapy in 1912. This compound not only is active against epilepsy, but at the same time is a powerful hypnotic. For the treatment of epilepsy high doses are used and, thus, the somniferous characteristics of the anti-epileptic are undesirable. In order to enable epileptic patients to live and work without being disturbed either by fits or by continuous sleepiness a specific anti-epileptic agent not having somniferous activity should be administered. The extensive work in this field has led to valuable preparations, such as 1-methyl-5-phenyl-5-ethyl-barbituric-acid, diphenylhydantoine, 3,5,5-trimethyl-oxazolidione-(2,4).

According to the present invention, a new anti-epileptic agent, 1,3,3-trimethyl-2,4-dioxo-piperidine, has been found. Whereas the constitution thereof is rather similar to the constitution of a certain class of hypnotics and, thus, the physical properties of the new compound actually are also similar to those of the said hypnotics, the new compound, however, has no somniferous activity and this fact is illustrated by the following pharmacological tests: Animals, especially rabbits, do not have any fits or convusions on administration of $\alpha,\beta$-cyclo-pentamethylene-tetrazol (25 mg./kg. given intravenously) after having been treated with small doses of the only slightly toxic new anti-epileptic agent (5.0 g./kg. are tolerated) and the protective dose does not make the animals sleepy or giddy; the same dose of $\alpha,\beta$-cyclo-pentamethylene-tetrazol, however, produces pronounced convulsions in unprotected animals. Furthermore, a stronger electric current must be conducted into the brains of cats in order to produce convulsions, after protection of the animals by administration of 1,3,3-trimethyl-2,4-dioxo-piperidine as compared to the results obtained with unprotected cats.

It is known to transform amino-methylene-dialkyl-aceto-acetic-acid-ester into 2,4-dioxo-3,3-dialkyl-tetrahydropyridines, to alkylate the same to 1,3,3-trialkyl-2,4-dioxo-tetrahydropyridines and to produce therefrom 1,3,3-trialkyl-2,4-dioxo-piperidines by hydrogenation. However, only compounds carrying higher alkyl, at least ethyl, radicals in position 3 have hitherto been prepared according to the said process. Consequent upon their somniferous activity such compounds are not well suited for the treatment of epilepsy. It could not be anticipated that 1,3,3-trimethyl-2,4-dioxo-piperidine would prove to be highly effective anti-epileptic agent in spite of its lack in somniferous capacity. Since the new compound is miscible with water it can be administered in any desired form. It is supported by men without producing side effects.

According to the present invention the new anti-epileptic may be obtained by transforming dimethyl-aceto-acetic-acid-ester via the oxymethylene and the aminomethylene derivative thereof into 2,4-dioxo-3,3-dimethyl-tetrahydro-pyridine, methylating the latter compound at the nitrogen atom and hydrogenating the 1,3,3-trimethyl-2,4-dioxo-tetrahydro-pyridine obtained. Thus, it is suitable to react dimethyl-aceto-acetic-acid-ester (I) with a formic-acid-ester in the presence of an alkaline condensing agent, such as sodium or sodium methylate etc. In order to transform the oxymethylene-dimethyl-aceto-acetic-acid-ester (II) into the corresponding aminomethylene compound (III), the former is treated with an ammonium derivative; it is suitable to react a salt of oxymethylene-dimethyl-acetic-acid-ester with ammoniumchloride or the free ester with ammoniumhydroxide. 2,4-dioxo-3,3-dimethyl-tetrahydro-pyridine (IV) is obtained from the amino-methylene compound by treating the latter with an alkaline condensing agent, such as sodium hydroxide or sodium alcoholate. The methylation of the tetrahydropyridine derivative at the nitrogen atom may suitably be brought about by treatment with dimethyl-sulfate and the methylated compound (V) may be transformed into 1,3,3-trimethyl-2,4-dioxo-piperidine (VI) by hydrogenation, preferably in the presence of a catalyst, such as palladium charcoal.

The course of the synthesis described above may be represented by the following formulae, wherein R and R' each represents a lower saturated alkyl radical:

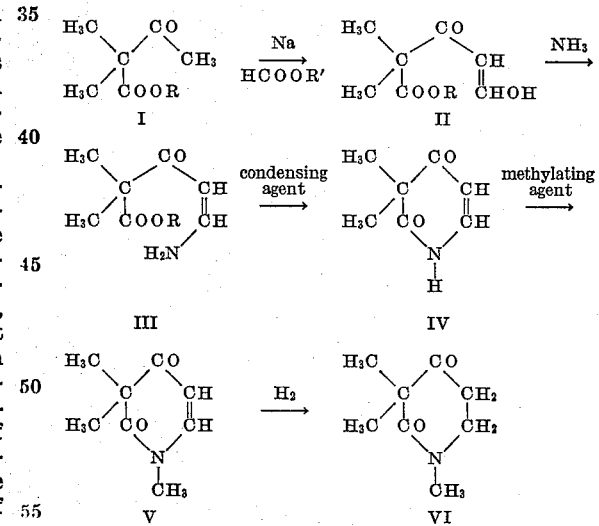

1,3,3-trimethyl-2,4-dioxo-piperidine forms colourless prisms having a melting point of 37–38° C. which easily yield neutral aqueous solutions. The compound is also easily soluble in the usual organic solvents. The boiling point thereof, at a pressure of 13 mm. Hg., is at 137–138° C. The phenylhydrazone thereof melts at 166–168° C.

*Example*

A mixture of 158 parts by weight of $\alpha,\alpha$-dimethyl-aceto-acetic-acid-ester and 102 parts of formic-acid-methylester is poured, at a temperature of about 15° C. in the course of 2 hours, while stirring well, into a suspension of 24 parts by weight of sodium powder in 800 parts by weight of toluene and stirring is continued for 20 hours at about 18° C. The sodium salt of $\gamma$-oxymethylene-$\alpha,\alpha$-dimethyl-aceto-acetic-acid-ester precipitates and forms a gelatinous mass while the small sodium balls gradually disappear. The solid sodium salt is separated by suction filtration and the filtrate is shaken out three times with 100 parts by weight of water each.

The solid sodium salt and the aqueous extract are heated, while stirring, for 1 hour to 65° C. together with 80 parts by weight of ammoniumchloride, 40 parts by weight of 25% ammonia solution and 600 parts by weight of benzene. The $\gamma$-amino-methylene-$\alpha,\alpha$-dimethyl aceto-acetic-acid-ester formed is taken up in the benzene. The benzene solution is separated from the mixture after termination of the reaction and evaporated. The major part of the oily residue consists of $\gamma$-aminomethylene-$\alpha,\alpha$-dimethyl-aceto-acetic-acid-ester. 185 parts by weight of the crude $\gamma$-aminomethylene-$\alpha,\alpha$-dimethyl-aceto-acetic-acid-ester are poured into a cold solution of 25 parts by weight of sodium in 300 parts by volume of methanol and are left to stand for 15 minutes at 20° C. whereby the sodium salt of 2,4-dioxo-3,3-dimethyl-tetrahydro-pyridine is formed. The free tetrahydro compound obtained by acidifying the solution of the sodium salt melts at 99–100° C.

The crude reaction mixture is diluted with 400 parts by volume of methanol and methylated at 25–30° C. with 132 parts by weight of dimethylsulfate. After evaporating the methanol the oily residue is taken up in benzene and separated from the undissolved salt by filtration. The benzene solution is evaporated in vacuo and the residue, 1,3,3-trimethyl-2,4-dioxo-tetrahydro-pyridine, may be distilled at 13 mm. Hg and 120–150° C. as a yellow water soluble oil.

500 parts by weight of 1,3,3-trimethyl-2,4-dioxo-tetrahydro-pyridine are dissolved in 1000 parts by volume of methanol, heated at 30° C. and hydrogenated under atmospheric pressure in the presence of 1.5 parts by weight of palladium metal in the form of 1% palladium charcoal. After suction filtration, evaporation and distillation at 137–138° C. and 13 mm. Hg. 1,3,3-trimethyl-2,4-dioxo-piperidine is obtained as an oil which, on standing, solidifies in the form of crystals. By recrystallisation from butyloxide transparent prisms with a melting point of 37–38° C. are obtained.

I claim:

The compound 1,3,3-trimethyl-2,4-dioxo-piperidine.

EDOUARD MASSET.

REFERENCES CITED

The following references are of record in the file of this patent:

UNITED STATES PATENTS

| Number | Name | Date |
|---|---|---|
| 2,090,068 | Preiswerk et al. | Aug. 17, 1937 |
| 2,151,047 | Preiswerk et al. | Mar. 1, 1939 |

FOREIGN PATENTS

| Number | Country | Date |
|---|---|---|
| 637,385 | Germany | Sept. 5, 1935 |

OTHER REFERENCES

Chemical Abstracts 4, 2304[4] (1910).